US009860886B2

(12) United States Patent
Kim et al.

(10) Patent No.: US 9,860,886 B2
(45) Date of Patent: Jan. 2, 2018

(54) METHODS AND DEVICES FOR TRANSCEIVING/TRANSMITTING DOWNLINK DATA IN WIRELESS ACCESS SYSTEM SUPPORTING NEW CARRIER TYPE

(71) Applicant: LG Electronics Inc., Seoul (KR)

(72) Inventors: Bonghoe Kim, Seoul (KR); Dongyoun Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 80 days.

(21) Appl. No.: 14/781,874

(22) PCT Filed: Apr. 17, 2014

(86) PCT No.: PCT/KR2014/003348
§ 371 (c)(1),
(2) Date: Oct. 1, 2015

(87) PCT Pub. No.: WO2014/171758
PCT Pub. Date: Oct. 23, 2014

(65) Prior Publication Data
US 2016/0037493 A1     Feb. 4, 2016

Related U.S. Application Data

(60) Provisional application No. 61/813,145, filed on Apr. 17, 2013.

(51) Int. Cl.
*H04W 72/04*    (2009.01)
*H04L 5/00*    (2006.01)
*H04L 1/00*    (2006.01)

(52) U.S. Cl.
CPC ......... *H04W 72/042* (2013.01); *H04L 5/0048* (2013.01); *H04W 72/0446* (2013.01); *H04L 1/0072* (2013.01); *H04L 5/001* (2013.01)

(58) Field of Classification Search
CPC ..... H04L 1/0072; H04L 5/001; H04L 5/0048; H04W 72/042; H04W 72/0446
See application file for complete search history.

(56) References Cited

U.S. PATENT DOCUMENTS

| 2013/0039291 A1 | 2/2013 | Blankenship et al. |
| 2013/0044727 A1 | 2/2013 | Nory et al. |
| 2014/0198675 A1* | 7/2014 | He ........................ H04L 5/0048 370/252 |

FOREIGN PATENT DOCUMENTS

WO     2012065523     5/2012

OTHER PUBLICATIONS

Huawei, et al., "Transmission Schemes for NCT," R1-130443, 3GPP TSG RAN WG1 Meeting #72, St. Julian's, Malta, Jan. 28-Feb. 1, 2013, see pp. 1-3.

(Continued)

*Primary Examiner* — Khaled Kassim
*Assistant Examiner* — Zhaohui Yang
(74) *Attorney, Agent, or Firm* — Dentons US LLP

(57) ABSTRACT

The present invention relates to a wireless access system, and provides methods for transmitting downlink data with a new carrier type (NCT) by using transmission diversity and devices for supporting same. According to one embodiment of the present invention, a method for user equipment receiving downlink data in the wireless access system supporting the new carrier type (NCT) comprises the steps of: receiving an upper layer signal comprising indication information indicating demodulation of downlink data into a user equipment-specific reference signal (URS), wherein the downlink data is transmitted by means of a distributed virtual resource block (DVRB) technique; receiving the downlink data and the URS transmitted using the DVRB technique by applying different precoding matrices to a first slot and a second slot in a subframe; demodulating the URS (Continued)

and estimating channel information with respect to the first slot and the second slot; and demodulating downlink data based on the channel information.

16 Claims, 11 Drawing Sheets

(56) References Cited

OTHER PUBLICATIONS

ZTE, "RS for Unsynchronised New Carrier Type and Transmission Mode," R1-122122, 3GPP TSG RAN WG1 Meeting #69, Prague, Czech Republic, May 21-25, 2012, see pp. 1, 2.

* cited by examiner

FIG. 4
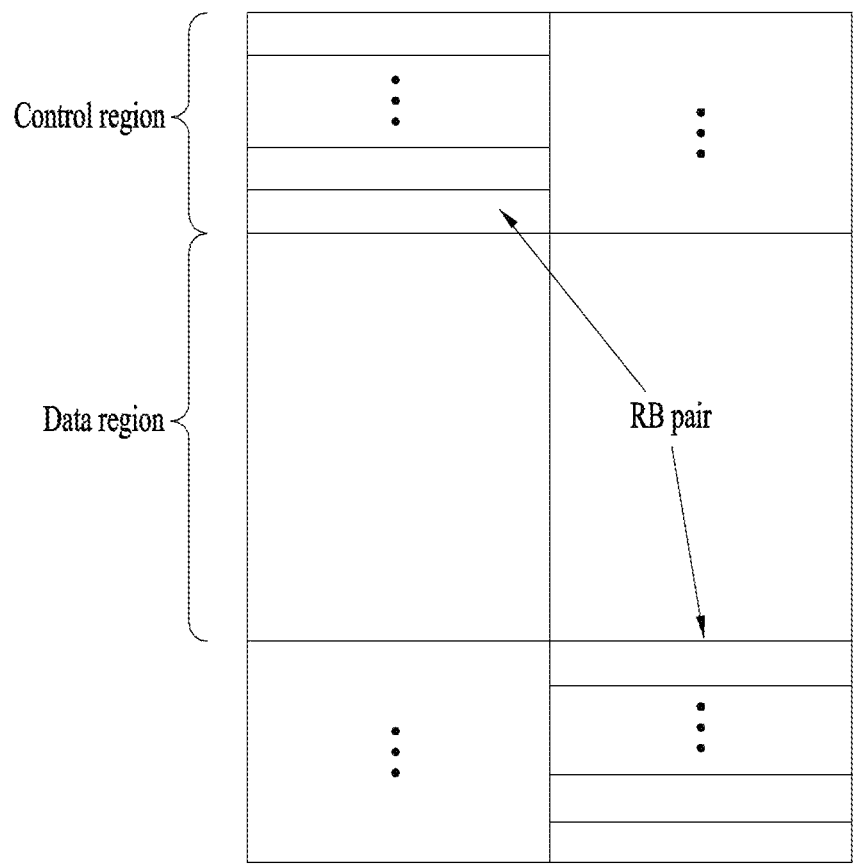
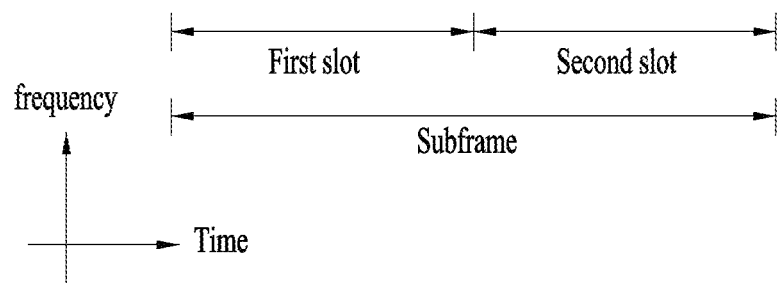

METHODS AND DEVICES FOR TRANSCEIVING/TRANSMITTING DOWNLINK DATA IN WIRELESS ACCESS SYSTEM SUPPORTING NEW CARRIER TYPE

This application is a 35 USC §371 National Stage entry of International Application No. PCT/KR2014/003348 filed on Apr. 17, 2014, and claims priority to U.S. Provisional Application No. 61/813,145 filed on Apr. 17, 2013, all of which are hereby incorporated by reference in their entireties as if fully set forth herein.

TECHNICAL FIELD

The present invention relates to a wireless access system, and more particularly, to methods for transmitting downlink data by using transmission diversity in a new carrier type (NCT) and devices for supporting the same.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

DISCLOSURE

Technical Problem

One object of the present invention is to provide a method for efficiently transmitting data in a carrier aggregation environment.

Another object of the present invention is to provide a method for supporting a transmission diversity operation during downlink data transmission in an NCT.

Still another object of the present invention is to provide a method for transmitting downlink data by using a UE-specific reference signal or demodulation reference signal in an NCT.

Further still another object of the present invention is to provide devices for supporting the aforementioned methods.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

The present invention relates to a wireless access system, and more particularly, to methods for transmitting downlink data by using transmission diversity in a new carrier type (NCT) and devices for supporting the same.

In one aspect of the present invention, a method for enabling a user equipment to receive downlink data in a wireless access system supporting a new carrier type (NCT) comprises the steps of receiving a higher layer signal, which includes indication information indicating demodulation of the downlink data into a user equipment-specific reference signal (URS), wherein the downlink data is transmitted by means of a distributed virtual resource block (DVRB) scheme; receiving the downlink data and the URS transmitted using the DVRB scheme on the assumption that different precoding matrixes are applied to a first slot and a second slot of a subframe; estimating channel information on the first slot and the second slot by demodulating the URS; and demodulating the downlink data on the basis of the channel information.

In another aspect of the present invention, a user equipment for receiving downlink data in a wireless access system supporting a new carrier type (NCT) comprises a receiver; and a processor for receiving the downlink data in the NCT by controlling the receiver, wherein the processor is configured to receive a higher layer signal, which includes indication information indicating demodulation of the downlink data into a user equipment-specific reference signal (URS) by controlling the receiver, wherein the downlink data is transmitted by means of a distributed virtual resource block (DVRB) scheme, receive the downlink data and the URS transmitted using the DVRB scheme on the assumption that different precoding matrixes are applied to a first slot and a second slot of a subframe, by controlling the receiver, estimate channel information on the first slot and the second slot by demodulating the URS, and demodulate the downlink data on the basis of the channel information.

At this time, the URS may be transmitted by being precoded by the same precoding matrix as that of the downlink data.

Also, the downlink data may include an enhanced physical downlink channel (E-PDCCH) signal.

The user equipment may be operated in a new carrier type (NCT) to which one or more of a synchronization signal, a cell specific reference signal (CRS), a downlink broadcast channel and a downlink control channel are not allocated.

In still another aspect of the present invention, a method for enabling a base station to transmit downlink data in a wireless access system supporting a new carrier type (NCT) comprises the steps of transmitting a higher layer signal, which includes indication information indicating demodulation of the downlink data into a user equipment-specific reference signal (URS), wherein the downlink data is transmitted by means of a distributed virtual resource block (DVRB) scheme; and transmitting the downlink data and the URS transmitted using the DVRB scheme by applying different precoding matrixes to a first slot and a second slot of a subframe.

In further still another aspect of the present invention, a base station for transmitting downlink data in a wireless access system supporting a new carrier type (NCT) comprises a transmitter; and a processor for transmitting the downlink data in the NCT.

At this time, the processor may be configured to transmit a higher layer signal, which includes indication information indicating demodulation of the downlink data into a user equipment-specific reference signal (URS) by controlling the transmitter, wherein the downlink data is transmitted by means of a distributed virtual resource block (DVRB) scheme, configure the downlink data and the URS in accordance with the DVRB scheme by applying different precoding matrixes a first slot and a second slot of a subframe, and transmit the downlink data and the URS.

At this time, the URS may be transmitted by being precoded by the same precoding matrix as that of the downlink data.

Also, the downlink data may include an enhanced physical downlink channel (E-PDCCH) signal.

The base station may be operated in a new carrier type (NCT) to which one or more of a synchronization signal, a cell specific reference signal (CRS), a downlink broadcast channel and a downlink control channel are not allocated.

The afore-described aspects of the present invention are merely a part of preferred embodiments of the present invention. Those skilled in the art will derive and understand various embodiments reflecting the technical features of the present invention from the following detailed description of the present invention.

Advantageous Effects

According to the embodiments of the present invention, the following effects can be achieved.

First of all, downlink data may be transmitted and received efficiently in a CA environment.

Second, a transmission diversity operation may be supported during downlink data transmission in an NCT, whereby data may be transmitted robustly.

Third, the downlink data may be transmitted using a UE-specific reference signal or demodulation reference signal in an NCT, whereby an optimized data service may be provided to a user equipment of a high speed moving environment.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention, illustrate embodiments of the invention and together with the description serve to explain the principle of the invention. In the drawings:

FIG. 4 illustrates a structure of an UpLink (UL) subframe;

BEST MODE FOR CARRYING OUT THE INVENTION

Figure 1:
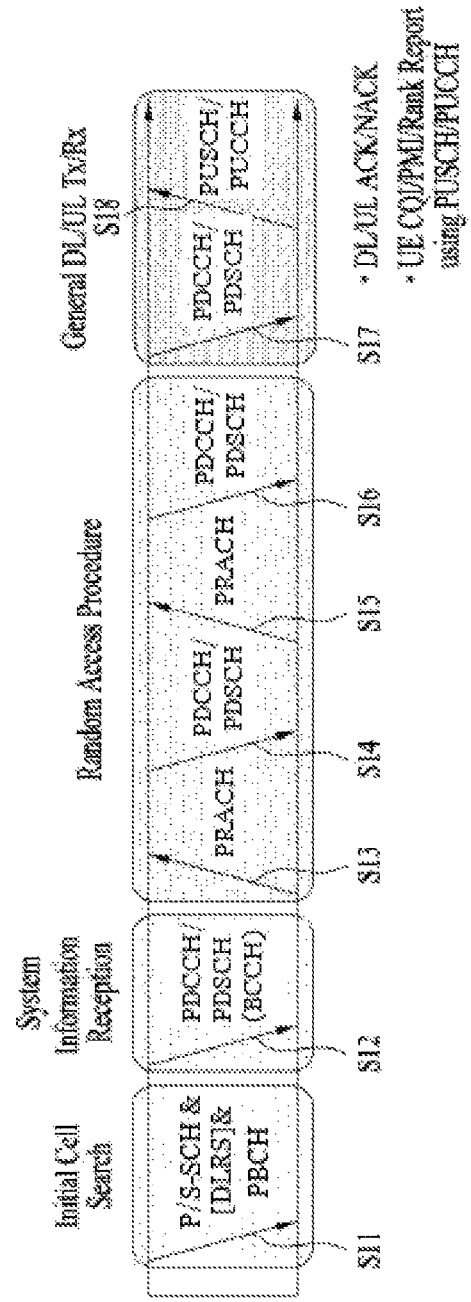
FIG. 1 illustrates physical channels and a general signal transmission method using the physical channels.

The present invention relates to a wireless access system, and more particularly, to methods for transmitting downlink data by using transmission diversity in a new carrier type (NCT) and devices for supporting the same.

The embodiments of the present invention described below are combinations of elements and features of the present invention in specific forms. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or elements of any one embodiment may be included in another embodiment and may be replaced with corresponding constructions or features of another embodiment.

In the description of the attached drawings, a detailed description of known procedures or steps of the present invention will be avoided lest it should obscure the subject matter of the present invention. In addition, procedures or steps that could be understood to those skilled in the art will not be described either.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmitter is a fixed and/or mobile node that provides a data service or a voice service and a receiver is a fixed and/or mobile node that receives a data service or a voice service. Therefore, a UE may serve as a transmitter and a BS may serve as a receiver, on an UpLink (UL). Likewise, the UE may serve as a receiver and the BS may serve as a transmitter, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, and a 3GPP2 system. In particular, the embodiments of the present disclosure may be supported by the standard specifications, 3GPP TS 36.211, 3GPP TS 36.212, 3GPP TS 36.213, and 3GPP TS 36.321. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the invention.

The following detailed description includes specific terms in order to provide a thorough understanding of the present disclosure. However, it will be apparent to those skilled in the art that the specific terms may be replaced with other terms without departing the technical spirit and scope of the present disclosure. In addition, all of the terms disclosed by the present description can be explained based on the standard specification documents.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1.3GPP LTE/LTE-A System

In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

1.1 System Overview

FIG. 1 illustrates physical channels and a general method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB. During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

Figure 2:
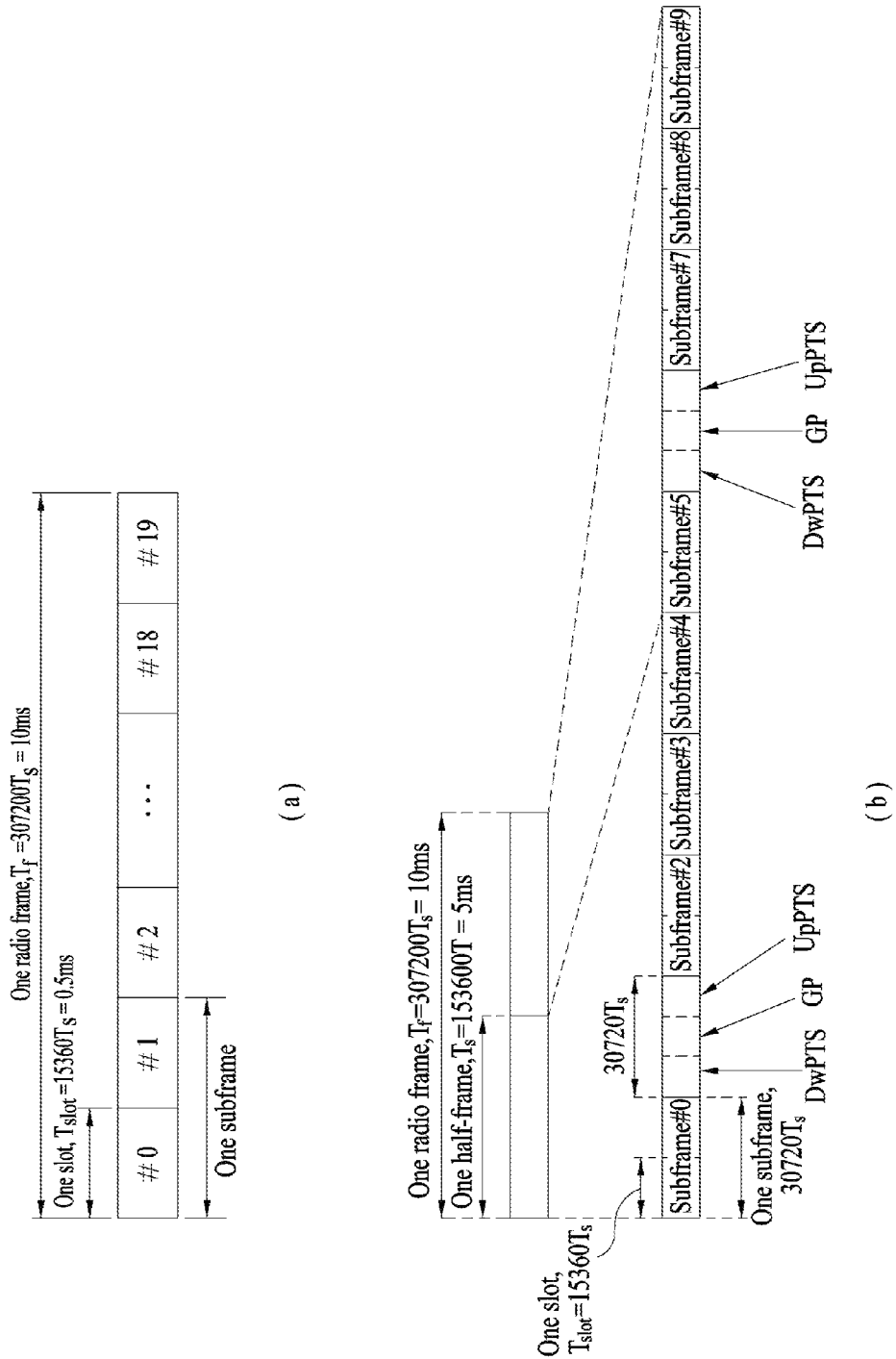
FIG. 2 illustrates radio frame structures.

FIG. 2 illustrates exemplary radio frame structures used in embodiments of the present disclosure.

FIG. 2(a) illustrates frame structure type 1. Frame structure type 1 is applicable to both a full Frequency Division Duplex (FDD) system and a half FDD system.

One radio frame is 10 ms ($T_f=307200 \cdot T_s$) long, including equal-sized 20 slots indexed from 0 to 19. Each slot is 0.5 ms ($T_{slot}=15360 \cdot T_s$) long. One subframe includes two successive slots. An $i^{th}$ subframe includes $2i^{th}$ and $(2i+1)^{th}$ slots. That is, a radio frame includes 10 subframes. A time required for transmitting one subframe is defined as a Transmission Time Interval (TTI). $T_s$ is a sampling time given as $T_s=1/(15 \text{ kHz} \times 2048)=3.2552 \times 10^{-8}$ (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms ($T_f$=307200·$T_s$) long, including two half-frames each having a length of 5 ms (=153600·$T_s$) long. Each half-frame includes five subframes each being 1 ms (=30720·$T_s$) long. An $i^{th}$ subframe includes $2i^{th}$ and $(2i+1)^{th}$ slots each having a length of 0.5 ms ($T_{slot}$=15360·$T_s$). $T_s$ is a sampling time given as $T_s$=1/(15 kHz×2048)=3.2552×10$^{-8}$ (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTS/GP/UpPTS lengths).

RBs of the RB pair occupy different subcarriers in two slots. Thus it is said that the RB pair frequency-hops over a slot boundary.

Figure 5:
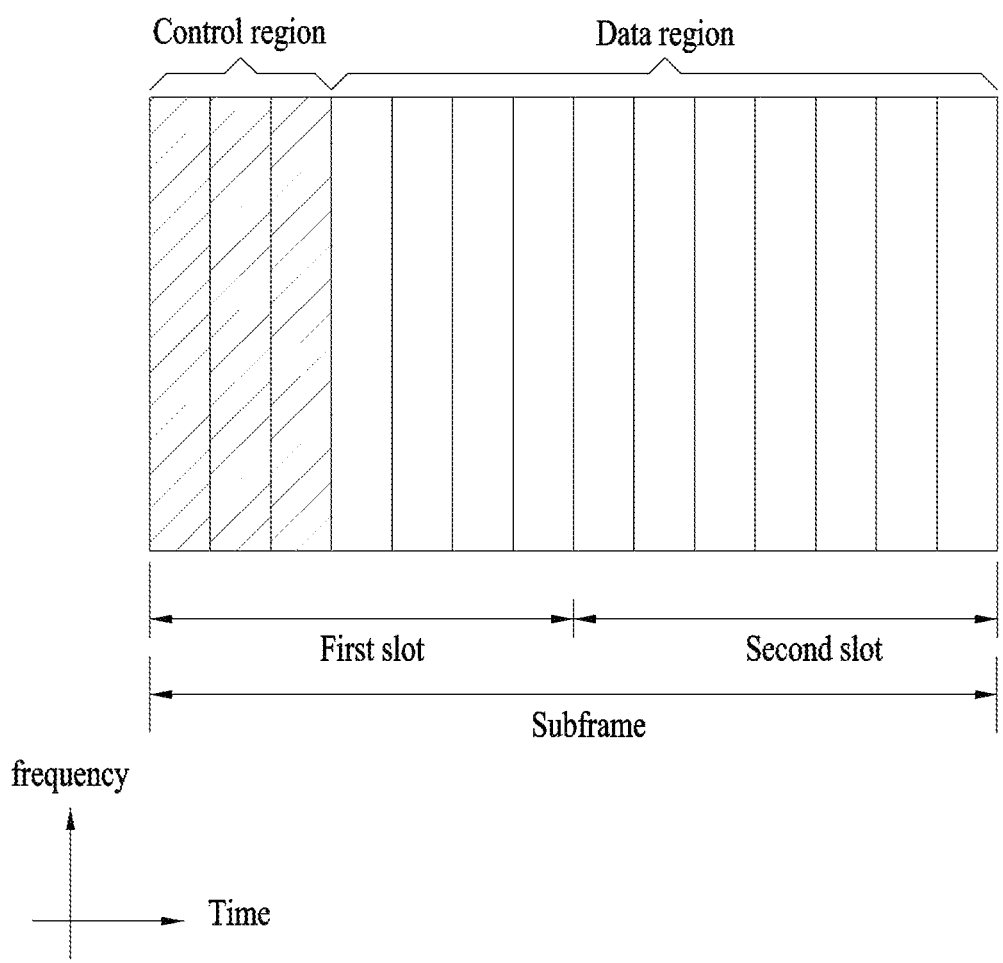
FIG. 5 illustrates a structure of a DL subframe.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

Figure 3:
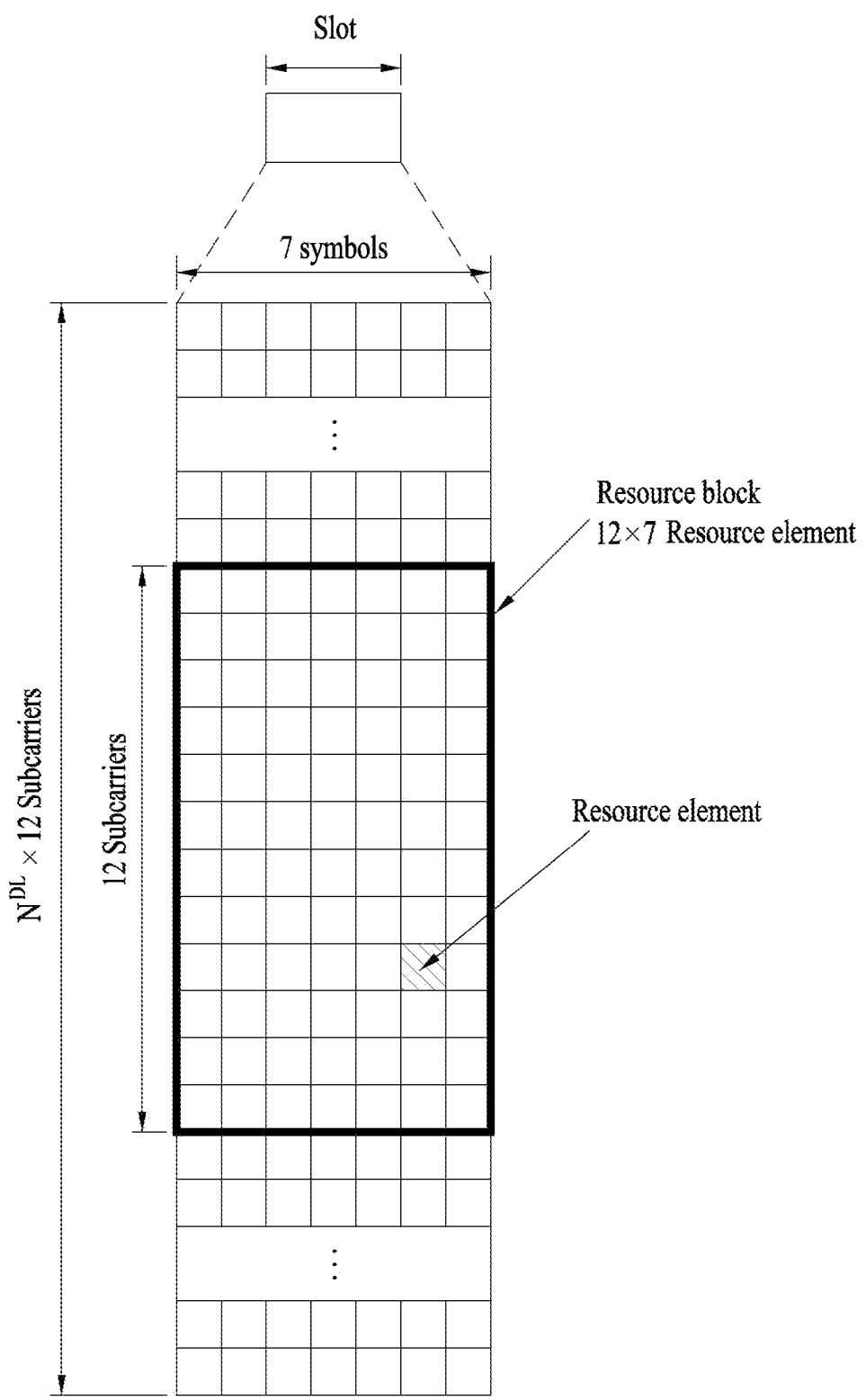
FIG. 3 illustrates a structure of a DownLink (DL) resource grid for the duration of one DL slot.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, NDL depends on a DL transmission bandwidth. A UL slot may have the same structure as a DL slot.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The 1.2 Carrier Aggregation (CA) Environment 1.2.1 CA Overview A 3GPP LTE system (conforming to Rel-8 or Rel-9) (hereinafter, referred to as an LTE system) uses Multi-Carrier Modulation (MCM) in which a single Component Carrier (CC) is divided into a plurality of bands. In contrast, a 3GPP LTE-A system (hereinafter, referred to an LTE-A system) may use CA by aggregating one or more CCs to support a broader system bandwidth than the LTE system. The term CA is interchangeably used with carrier combining, multi-CC environment, or multi-carrier environment.

In the present invention, multi-carrier means CA (or carrier combining). Herein, CA covers aggregation of contiguous carriers and aggregation of non-contiguous carriers. The number of aggregated CCs may be different for a DL and a UL. If the number of DL CCs is equal to the number of UL CCs, this is called symmetric aggregation. If the number of DL CCs is different from the number of UL CCs, this is called asymmetric aggregation. The term CA is interchangeable with carrier combining, bandwidth aggregation, spectrum aggregation, etc.

The LTE-A system aims to support a bandwidth of up to 100 MHz by aggregating two or more CCs, that is, by CA. To guarantee backward compatibility with a legacy IMT system, each of one or more carriers, which has a smaller bandwidth than a target bandwidth, may be limited to a bandwidth used in the legacy system.

For example, the legacy 3GPP LTE system supports bandwidths {1.4, 3, 5, 10, 15, and 20 MHz} and the 3GPP LTE-A system may support a broader bandwidth than 20 MHz using these LTE bandwidths. A CA system of the present invention may support CA by defining a new bandwidth irrespective of the bandwidths used in the legacy system.

There are two types of CA, intra-band CA and inter-band CA. Intra-band CA means that a plurality of DL CCs and/or UL CCs are successive or adjacent in frequency. In other words, the carrier frequencies of the DL CCs and/or UL CCs are positioned in the same band. On the other hand, an environment where CCs are far away from each other in frequency may be called inter-band CA. In other words, the carrier frequencies of a plurality of DL CCs and/or UL CCs are positioned in different bands. In this case, a UE may use a plurality of Radio Frequency (RF) ends to conduct communication in a CA environment.

The LTE-A system adopts the concept of cell to manage radio resources. The above-described CA environment may be referred to as a multi-cell environment. A cell is defined as a pair of DL and UL CCs, although the UL resources are not mandatory. Accordingly, a cell may be configured with DL resources alone or DL and UL resources.

For example, if one serving cell is configured for a specific UE, the UE may have one DL CC and one UL CC. If two or more serving cells are configured for the UE, the UE may have as many DL CCs as the number of the serving cells and as many UL CCs as or fewer UL CCs than the number of the serving cells, or vice versa. That is, if a plurality of serving cells are configured for the UE, a CA environment using more UL CCs than DL CCs may also be supported.

CA may be regarded as aggregation of two or more cells having different carrier frequencies (center frequencies). Herein, the term 'cell' should be distinguished from 'cell' as a geographical area covered by an eNB. Hereinafter, intra-band CA is referred to as intra-band multi-cell and inter-band CA is referred to as inter-band multi-cell.

In the LTE-A system, a Primacy Cell (PCell) and a Secondary Cell (SCell) are defined. A PCell and an SCell may be used as serving cells. For a UE in RRC_CONNECTED state, if CA is not configured for the UE or the UE does not support CA, a single serving cell including only a PCell exists for the UE. On the contrary, if the UE is in RRC_CONNECTED state and CA is configured for the UE, one or more serving cells may exist for the UE, including a PCell and one or more SCells.

Serving cells (PCell and SCell) may be configured by an RRC parameter. A physical-layer ID of a cell, PhysCellId is an integer value ranging from 0 to 503. A short ID of an SCell, SCellIndex is an integer value ranging from 1 to 7. A short ID of a serving cell (PCell or SCell), ServeCellIndex is an integer value ranging from 1 to 7. If ServeCellIndex is 0, this indicates a PCell and the values of ServeCellIndex for SCells are pre-assigned. That is, the smallest cell ID (or cell index) of ServeCellIndex indicates a PCell.

A PCell refers to a cell operating in a primary frequency (or a primary CC). A UE may use a PCell for initial connection establishment or connection reestablishment. The PCell may be a cell indicated during handover. In addition, the PCell is a cell responsible for control-related communication among serving cells configured in a CA environment. That is, PUCCH allocation and transmission for the UE may take place only in the PCell. In addition, the UE may use only the PCell in acquiring system information or changing a monitoring procedure. An Evolved Universal Terrestrial Radio Access Network (E-UTRAN) may change only a PCell for a handover procedure by a higher-layer RRCConnectionReconfiguraiton message including mobilityControlInfo to a UE supporting CA.

An SCell may refer to a cell operating in a secondary frequency (or a secondary CC). Although only one PCell is allocated to a specific UE, one or more SCells may be allocated to the UE. An SCell may be configured after RRC connection establishment and may be used to provide additional radio resources. There is no PUCCH in cells other than a PCell, that is, in SCells among serving cells configured in the CA environment.

When the E-UTRAN adds an SCell to a UE supporting CA, the E-UTRAN may transmit all system information related to operations of related cells in RRC_CONNECTED state to the UE by dedicated signaling. Changing system information may be controlled by releasing and adding a related SCell. Herein, a higher-layer RRCConnectionReconfiguration message may be used. The E-UTRAN may transmit a dedicated signal having a different parameter for each cell rather than it broadcasts in a related SCell.

After an initial security activation procedure starts, the E-UTRAN may configure a network including one or more SCells by adding the SCells to a PCell initially configured during a connection establishment procedure. In the CA environment, each of a PCell and an SCell may operate as a CC. Hereinbelow, a Primary CC (PCC) and a PCell may be used in the same meaning and a Secondary CC (SCC) and an SCell may be used in the same meaning in embodiments of the present invention.

1.2.2 Cross Carrier Scheduling

Two scheduling schemes, self-scheduling and cross carrier scheduling are defined for a CA system, from the perspective of carriers or serving cells. Cross carrier scheduling may be called cross CC scheduling or cross cell scheduling.

In self-scheduling, a PDCCH (carrying a DL grant) and a PDSCH are transmitted in the same DL CC or a PUSCH is transmitted in a UL CC linked to a DL CC in which a PDCCH (carrying a UL grant) is received.

In cross carrier scheduling, a PDCCH (carrying a DL grant) and a PDSCH are transmitted in different DL CCs or a PUSCH is transmitted in a UL CC other than a UL CC linked to a DL CC in which a PDCCH (carrying a UL grant) is received.

Cross carrier scheduling may be activated or deactivated UE-specifically and indicated to each UE semi-statically by higher-layer signaling (e.g. RRC signaling).

If cross carrier scheduling is activated, a Carrier Indicator Field (CIF) is required in a PDCCH to indicate a DL/UL CC in which a PDSCH/PUSCH indicated by the PDCCH is to be transmitted. For example, the PDCCH may allocate PDSCH resources or PUSCH resources to one of a plurality of CCs by the CIF. That is, when a PDCCH of a DL CC allocates PDSCH or PUSCH resources to one of aggregated DL/UL CCs, a CIF is set in the PDCCH. In this case, the DCI formats of LTE Release-8 may be extended according to the CIF. The CIF may be fixed to three bits and the position of the CIF may be fixed irrespective of a DCI format size. In addition, the LTE Release-8 PDCCH structure (the same coding and resource mapping based on the same CCEs) may be reused.

On the other hand, if a PDCCH transmitted in a DL CC allocates PDSCH resources of the same DL CC or allocates PUSCH resources in a single UL CC linked to the DL CC, a CIF is not set in the PDCCH. In this case, the LTE Release-8 PDCCH structure (the same coding and resource mapping based on the same CCEs) may be used.

If cross carrier scheduling is available, a UE needs to monitor a plurality of PDCCHs for DCI in the control region of a monitoring CC according to the transmission mode and/or bandwidth of each CC. Accordingly, an appropriate SS configuration and PDCCH monitoring are needed for the purpose.

In the CA system, a UE DL CC set is a set of DL CCs scheduled for a UE to receive a PDSCH, and a UE UL CC set is a set of UL CCs scheduled for a UE to transmit a PUSCH. A PDCCH monitoring set is a set of one or more DL CCs in which a PDCCH is monitored. The PDCCH monitoring set may be identical to the UE DL CC set or may be a subset of the UE DL CC set. The PDCCH monitoring set may include at least one of the DL CCs of the UE DL CC set. Or the PDCCH monitoring set may be defined irrespective of the UE DL CC set. DL CCs included in the PDCCH monitoring set may be configured to always enable self-scheduling for UL CCs linked to the DL CCs. The UE DL CC set, the UE UL CC set, and the PDCCH monitoring set may be configured UE-specific ally, UE group-specifically, or cell-specifically.

If cross carrier scheduling is deactivated, this implies that the PDCCH monitoring set is always identical to the UE DL CC set. In this case, there is no need for signaling the PDCCH monitoring set. However, if cross carrier scheduling is activated, the PDCCH monitoring set is preferably defined within the UE DL CC set. That is, the eNB transmits a PDCCH only in the PDCCH monitoring set to schedule a PDSCH or PUSCH for the UE.

Figure 6:
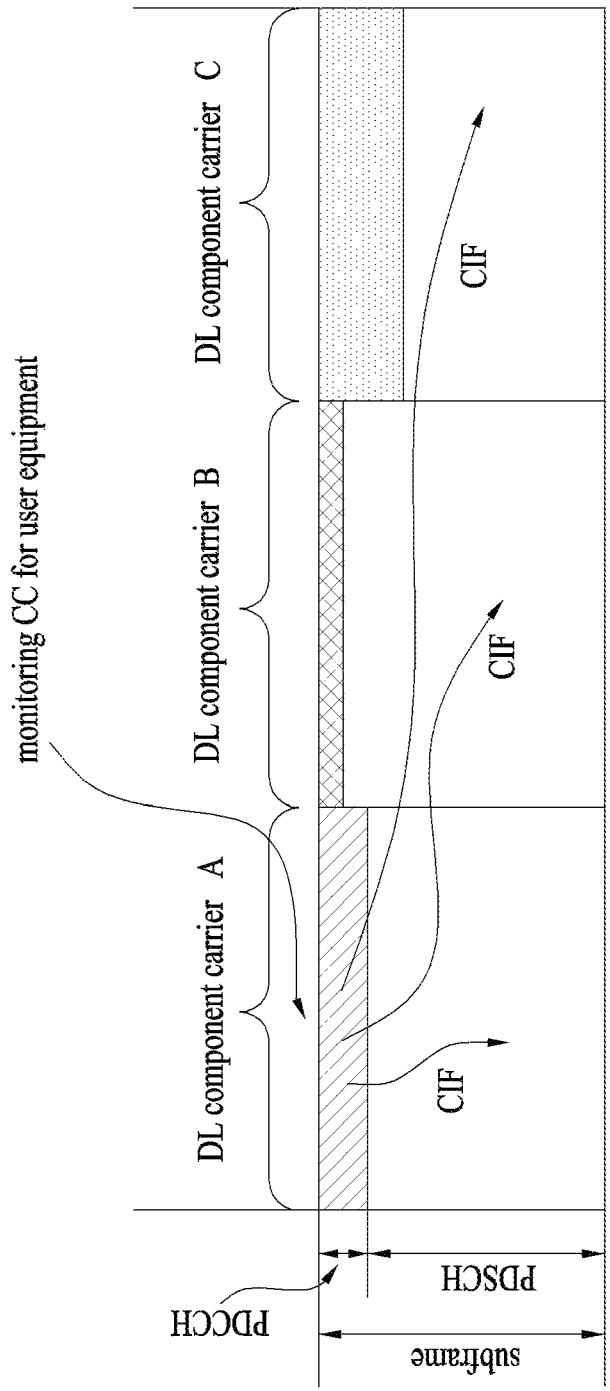
FIG. 6 illustrates a cross carrier-scheduled subframe structure in the LTE-A system.

FIG. 6 illustrates a cross carrier-scheduled subframe structure in the LTE-A system, which is used in embodiments of the present invention.

Referring to FIG. 6, three DL CCs are aggregated for a DL subframe for LTE-A UEs. DL CC 'A' is configured as a PDCCH monitoring DL CC. If a CIF is not used, each DL CC may deliver a PDCCH that schedules a PDSCH in the same DL CC without a CIF. On the other hand, if the CIF is used by higher-layer signaling, only DL CC 'A' may carry a PDCCH that schedules a PDSCH in the same DL CC 'A' or another CC. Herein, no PDCCH is transmitted in DL CC 'B' and DL CC 'C' that are not configured as PDCCH monitoring DL CCs.

1.3 Physical Downlink Control Channel (PDCCH)

1.3.1 PDCCH Overview

The PDCCH may deliver information about resource allocation and a transport format for a Downlink Shared Channel (DL-SCH) (i.e. a DL grant), information about resource allocation and a transport format for an Uplink Shared Channel (UL-SCH) (i.e. a UL grant), paging information of a Paging Channel (PCH), system information on the DL-SCH, information about resource allocation for a higher-layer control message such as a random access response transmitted on the PDSCH, a set of Tx power control commands for individual UEs of a UE group, Voice Over Internet Protocol (VoIP) activation indication information, etc.

A plurality of PDCCHs may be transmitted in the control region. A UE may monitor a plurality of PDCCHs. A PDCCH is transmitted in an aggregate of one or more consecutive Control Channel Elements (CCEs). A PDCCH made up of one or more consecutive CCEs may be transmitted in the control region after subblock interleaving. A CCE is a logical allocation unit used to provide a PDCCH at a code rate based on the state of a radio channel. A CCE includes a plurality of RE Groups (REGs). The format of a PDCCH and the number of available bits for the PDCCH are determined according to the relationship between the number of CCEs and a code rate provided by the CCEs.

1.3.2 PDCCH Structure

A plurality of PDCCHs for a plurality of UEs may be multiplexed and transmitted in the control region. A PDCCH is made up of an aggregate of one or more consecutive CCEs. A CCE is a unit of 9 REGs each REG including 4 REs. Four Quadrature Phase Shift Keying (QPSK) symbols are mapped to each REG. REs occupied by RSs are excluded from REGs. That is, the total number of REGs in an OFDM symbol may be changed depending on the presence or absence of a cell-specific RS. The concept of an REG to which four REs are mapped is also applicable to other DL control channels (e.g. the PCFICH or the PHICH). Let the number of REGs that are not allocated to the PCFICH or the PHICH be denoted by $N_{REG}$. Then the number of CCEs available to the system is $N_{CCE}$ ($=\lfloor N_{REG}/9 \rfloor$) and the CCEs are indexed from 0 to NCCE−1.

To simplify the decoding process of a UE, a PDCCH format including n CCEs may start with a CCE having an index equal to a multiple of n. That is, given CCE the PDCCH format may start with a CCE satisfying i mod n=0.

The eNB may configure a PDCCH with 1, 2, 4, or 8 CCEs. {1, 2, 4, 8} are called CCE aggregation levels. The number of CCEs used for transmission of a PDCCH is determined according to a channel state by the eNB. For example, one CCE is sufficient for a PDCCH directed to a UE in a good DL channel state (a UE near to the eNB). On the other hand, 8 CCEs may be required for a PDCCH directed to a UE in a poor DL channel state (a UE at a cell edge) in order to ensure sufficient robustness.

[Table 2] below illustrates PDCCH formats. 4 PDCCH formats are supported according to CCE aggregation levels as illustrated in [Table 2].

TABLE 2

| PDCCH format | Number of CCEs (n) | Number of REGs | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

A different CCE aggregation level is allocated to each UE because the format or Modulation and Coding Scheme (MCS) level of control information delivered in a PDCCH for the UE is different. An MCS level defines a code rate used for data coding and a modulation order. An adaptive MCS level is used for link adaptation. In general, three or four MCS levels may be considered for control channels carrying control information.

Regarding the formats of control information, control information transmitted on a PDCCH is called DCI. The configuration of information in PDCCH payload may be changed depending on the DCI format. The PDCCH payload is information bits. [Table 3] lists DCI according to DCI formats.

TABLE 3

| DCI Format | Description |
|---|---|
| Format 0 | Resource grants for the PUSCH transmissions (uplink) |
| Format 1 | Resource assignments for single codeword PDSCH transmissions (transmission modes 1, 2 and 7) |

TABLE 3-continued

| DCI Format | Description |
|---|---|
| Format 1A | Compact signaling of resource assignments for single codeword PDSCH (all modes) |
| Format 1B | Compact resource assignments for PDSCH using rank-1 closed loop precoding (mode 6) |
| Format 1C | Very compact resource assignments for PDSCH (e.g. paging/broadcast system information) |
| Format 1D | Compact resource assignments for PDSCH using multi-user MIMO (mode 5) |
| Format 2 | Resource assignments for PDSCH for closed-loop MIMO operation (mode 4) |
| Format 2A | Resource assignments for PDSCH for open-loop MIMO operation (mode 3) |
| Format 3/3A | Power control commands for PUCCH and PUSCH with 2-bit/1-bit power adjustment |
| Format 4 | Scheduling of PUSCH in one UL cell with multi-antenna port transmission mode |

Referring to [Table 3], the DCI formats include Format 0 for PUSCH scheduling, Format 1 for single-codeword PDSCH scheduling, Format 1A for compact single-codeword PDSCH scheduling, Format 1C for very compact DL-SCH scheduling, Format 2 for PDSCH scheduling in a closed-loop spatial multiplexing mode, Format 2A for PDSCH scheduling in an open-loop spatial multiplexing mode, and Format 3/3A for transmission of Transmission Power Control (TPC) commands for uplink channels. DCI Format 1A is available for PDSCH scheduling irrespective of the transmission mode of a UE.

The length of PDCCH payload may vary with DCI formats. In addition, the type and length of PDCCH payload may be changed depending on compact or non-compact scheduling or the transmission mode of a UE.

The transmission mode of a UE may be configured for DL data reception on a PDSCH at the UE. For example, DL data carried on a PDSCH includes scheduled data, a paging message, a random access response, broadcast information on a BCCH, etc. for a UE. The DL data of the PDSCH is related to a DCI format signaled through a PDCCH. The transmission mode may be configured semi-statically for the UE by higher-layer signaling (e.g. Radio Resource Control (RRC) signaling). The transmission mode may be classified as single antenna transmission or multi-antenna transmission.

A transmission mode is configured for a UE semi-statically by higher-layer signaling. For example, multi-antenna transmission scheme may include transmit diversity, open-loop or closed-loop spatial multiplexing, Multi-User Multiple Input Multiple Output (MU-MIMO), or beamforming. Transmit diversity increases transmission reliability by transmitting the same data through multiple Tx antennas. Spatial multiplexing enables high-speed data transmission without increasing a system bandwidth by simultaneously transmitting different data through multiple Tx antennas. Beamforming is a technique of increasing the Signal to Interference plus Noise Ratio (SINR) of a signal by weighting multiple antennas according to channel states.

A DCI format for a UE depends on the transmission mode of the UE. The UE has a reference DCI format monitored according to the transmission mode configure for the UE. The following 10 transmission modes are available to UEs:
Transmission mode 1: Single antenna transmission
Transmission mode 2: Transmission diversity
Transmission mode 3: Open-loop codebook based precoding when the number of layer is greater than 1, Transmission diversity when the number of rank is 1
Transmission mode 4: closed-loop codebook based precoding
Transmission mode 5: Multi-user MIMO of transmission mode 4 version
Transmission mode 6: closed-loop codebook based precoding which is specifically limited for signal layer transmission
Transmission mode 7: precoding dose not based on codebooks only supporting single layer transmission (release 8)
Transmission mode 8: precoding dose not based on codebooks supporting maximum 2 layers (release 9)
Transmission mode 9: precoding dose not based on codebooks supporting maximum 8 layers (release 10)
Transmission mode 10: precoding dose not based on codebooks supporting maximum 8 layers, for CoMP use (release 11)

1.3.3 PDCCH Transmission

The eNB determines a PDCCH format according to DCI that will be transmitted to the UE and adds a Cyclic Redundancy Check (CRC) to the control information. The CRC is masked by a unique Identifier (ID) (e.g. a Radio Network Temporary Identifier (RNTI)) according to the owner or usage of the PDCCH. If the PDCCH is destined for a specific UE, the CRC may be masked by a unique ID (e.g. a cell-RNTI (C-RNTI)) of the UE. If the PDCCH carries a paging message, the CRC of the PDCCH may be masked by a paging indicator ID (e.g. a Paging-RNTI (P-RNTI)). If the PDCCH carries system information, particularly, a System Information Block (SIB), its CRC may be masked by a system information ID (e.g. a System Information RNTI (SI-RNTI)). To indicate that the PDCCH carries a random access response to a random access preamble transmitted by a UE, its CRC may be masked by a Random Access-RNTI (RA-RNTI).

Then the eNB generates coded data by channel-encoding the CRC-added control information. The channel coding may be performed at a code rate corresponding to an MCS level. The eNB rate-matches the coded data according to a CCE aggregation level allocated to a PDCCH format and generates modulation symbols by modulating the coded data. Herein, a modulation order corresponding to the MCS level may be used for the modulation. The CCE aggregation level for the modulation symbols of a PDCCH may be one of 1, 2, 4, and 8. Subsequently, the eNB maps the modulation symbols to physical REs (i.e. CCE to RE mapping).

1.4 Reference Signal (RS)

Hereinafter, reference signals are explained, which are used for the embodiments of the present invention.

Figure 7:
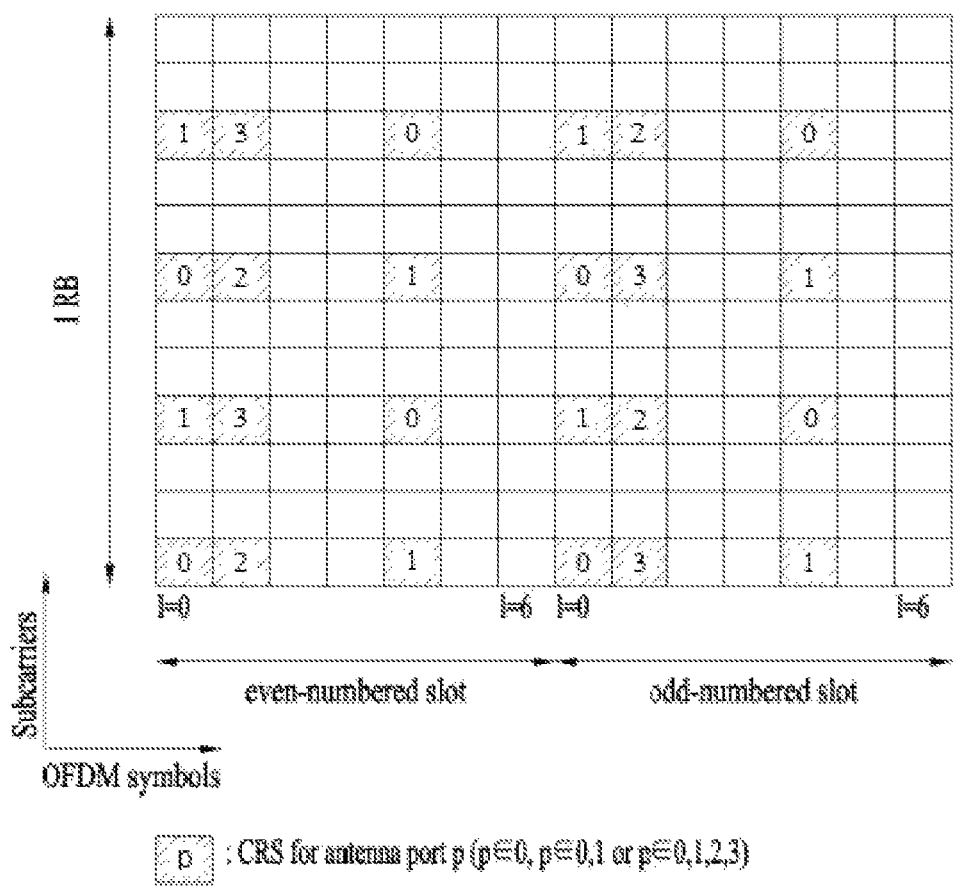
FIG. 7 illustrates a subframe to which cell specific reference signals (CRSs) are allocated.

FIG. 7 illustrates a subframe to which cell specific reference signals (CRSs) are allocated, which may be used in embodiments of the present disclosure.

FIG. 7 represents an allocation structure of the CRS in case of the system supporting 4 antennas. Since CRSs are used for both demodulation and measurement, the CRSs are transmitted in all DL subframes in a cell supporting PDSCH transmission and are transmitted through all antenna ports configured at an eNB.

More specifically, CRS sequence is mapped to complex-modulation symbols used as reference symbols for antenna port p in slot $n_s$.

A UE may measure CSI using the CRSs and demodulate a signal received on a PDSCH in a subframe including the CRSs. That is, the eNB transmits the CRSs at predetermined locations in each RB of all RBs and the UE performs channel estimation based on the CRSs and detects the PDSCH. For example, the UE may measure a signal received on a CRS RE and detect a PDSCH signal from an RE to which the PDSCH is mapped using the measured signal and using the ratio of reception energy per CRS RE to reception energy per PDSCH mapped RE.

When the PDSCH is transmitted based on the CRSs, since the eNB should transmit the CRSs in all RBs, unnecessary RS overhead occurs. To solve such a problem, in a 3GPP LTE-A system, a UE-specific RS (hereinafter, UE-RS) and a CSI-RS are further defined in addition to a CRS. The UE-RS is used for demodulation and the CSI-RS is used to derive CSI. The UE-RS is one type of a DRS.

Since the UE-RS and the CRS may be used for demodulation, the UE-RS and the CRS can be regarded as demodulation RSs in terms of usage. Since the CSI-RS and the CRS are used for channel measurement or channel estimation, the CSI-RS and the CRS can be regarded as measurement RSs.

Figure 8:
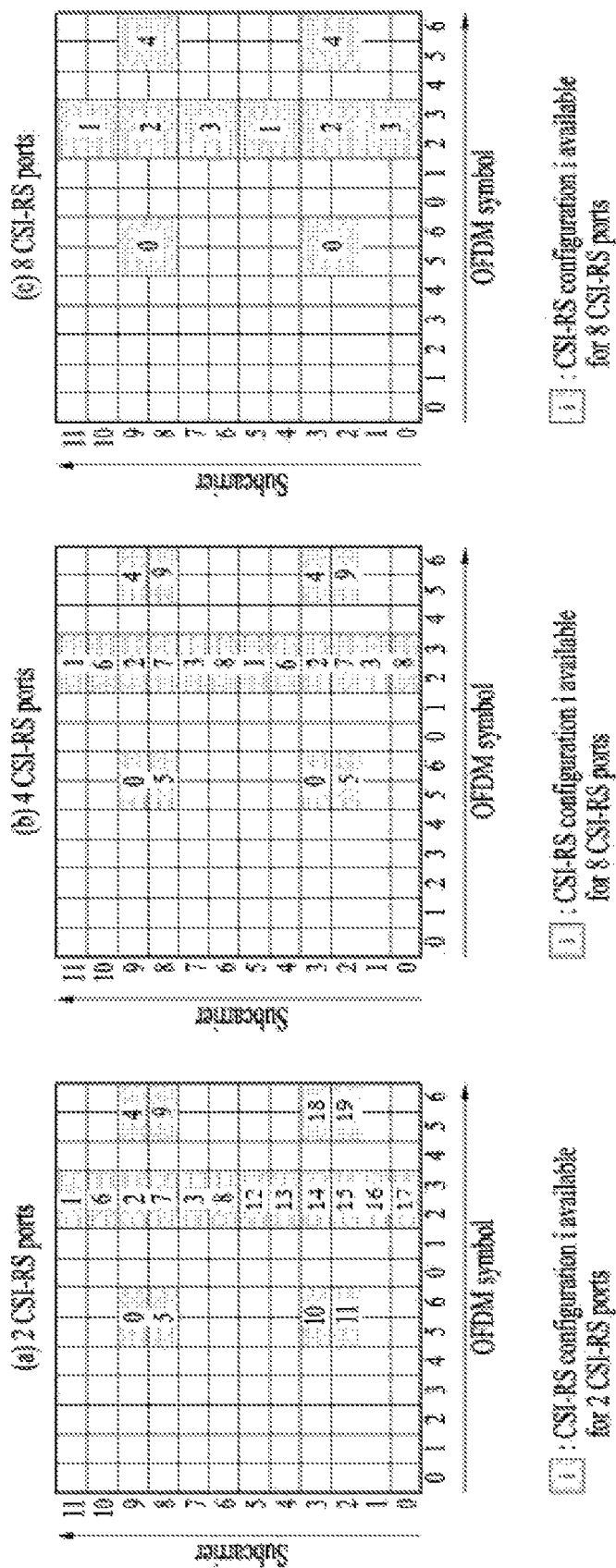
FIG. 8 illustrates an example of subframes to which channel state information reference signals (CSI-RSs) are allocated according to the number of antenna ports.

FIG. 8 illustrates channel state information reference signal (CSI-RS) configurations allocated according to the number of antenna ports, which may be used in embodiments of the present disclosure.

A CSI-RS is a DL RS that is introduced in a 3GPP LTE-A system for channel measurement rather than for demodulation. In the 3GPP LTE-A system, a plurality of CSI-RS configurations is defined for CSI-RS transmission. In subframes in which CSI-RS transmission is configured, CSI-RS sequence is mapped to complex modulation symbols used as RSs on antenna port p.

FIG. 8(a) illustrates 20 CSI-RS configurations 0 to 19 available for CSI-RS transmission through two CSI-RS ports among the CSI-RS configurations, FIG. 8(b) illustrates 10 available CSI-RS configurations 0 to 9 through four CSI-RS ports among the CSI-RS configurations, and FIG. 8(c) illustrates 5 available CSI-RS configurations 0 to 4 through 8 CSI-RS ports among the CSI-RS configurations.

The CSI-RS ports refer to antenna ports configured for CSI-RS transmission. Since CSI-RS configuration differs according to the number of CSI-RS ports, if the numbers of antenna ports configured for CSI-RS transmission differ, the same CSI-RS configuration number may correspond to different CSI-RS configurations.

Unlike a CRS configured to be transmitted in every subframe, a CSI-RS is configured to be transmitted at a prescribed period corresponding to a plurality of subframes. Accordingly, CSI-RS configurations vary not only with the locations of REs occupied by CSI-RSs in an RB pair according to Table 6 or Table 7 but also with subframes in which CSI-RSs are configured.

Meanwhile, if subframes for CSI-RS transmission differ even when CSI-RS configuration numbers are the same, CSI-RS configurations also differ. For example, if CSI-RS transmission periods ($T_{CSI-RS}$) differ or if start subframes ($\Delta_{CSI-RS}$) in which CSI-RS transmission is configured in one radio frame differ, this may be considered as different CSI-RS configurations.

Hereinafter, in order to distinguish between a CSI-RS configuration to which (1) a CSI-RS configuration is assigned and (2) a CSI-RS configuration varying according to a CSI-RS configuration number, the number of CSI-RS ports, and/or a CSI-RS configured subframe, the CSI-RS configuration of the latter will be referred to as a CSI-RS resource configuration. The CSI-RS configuration of the former will be referred to as a CSI-RS configuration or CSI-RS pattern.

Upon informing a UE of the CSI-RS resource configuration, an eNB may inform the UE of information about the number of antenna ports used for transmission of CSI-RSs, a CSI-RS pattern, CSI-RS subframe configuration $I_{CSI-RS}$, UE assumption on reference PDSCH transmitted power for CSI feedback $P_c$, a zero-power CSI-RS configuration list, a zero-power CSI-RS subframe configuration, etc.

CSI-RS subframe configuration $I_{CSI-RS}$ is information for specifying subframe configuration periodicity $T_{CSI-RS}$ and subframe offset $\Delta_{CSI-RS}$ regarding occurrence of the CSI-RSs. The following table 8 shows CSI-RS subframe configuration $I_{CSI-RS}$ according to TCSI-RS and $\Delta$CSI-RS.

TABLE 8

| CSI-RS-<br>SubframeConfig<br>ICSI-RS | CSI-RS<br>periodicity<br>TCSI-RS (subframes) | CSI-RS<br>subframe offset<br>ΔCSI-RS (subframes) |
|---|---|---|
| 0-4 | 5 | ICSI-RS |
| 5-14 | 10 | ICSI-RS – 5 |
| 15-34 | 20 | ICSI-RS – 15 |
| 35-74 | 40 | ICSI-RS – 35 |
| 75-154 | 80 | ICSI-RS – 75 |

Subframes satisfying the following Equation 1 are subframes including CSI-RSs.

$$(10n_f + \lfloor n_s/2 \rfloor - \Delta_{CSI-RS}) \mod T_{CSI-RS} = 0 \quad \text{[Equation 1]}$$

A UE configured as transmission modes defined after introduction of the 3GPP LTE-A system (e.g. transmission mode 9 or other newly defined transmission modes) may perform channel measurement using a CSI-RS and decode a PDSCH using a UE-RS.

Figure 9:
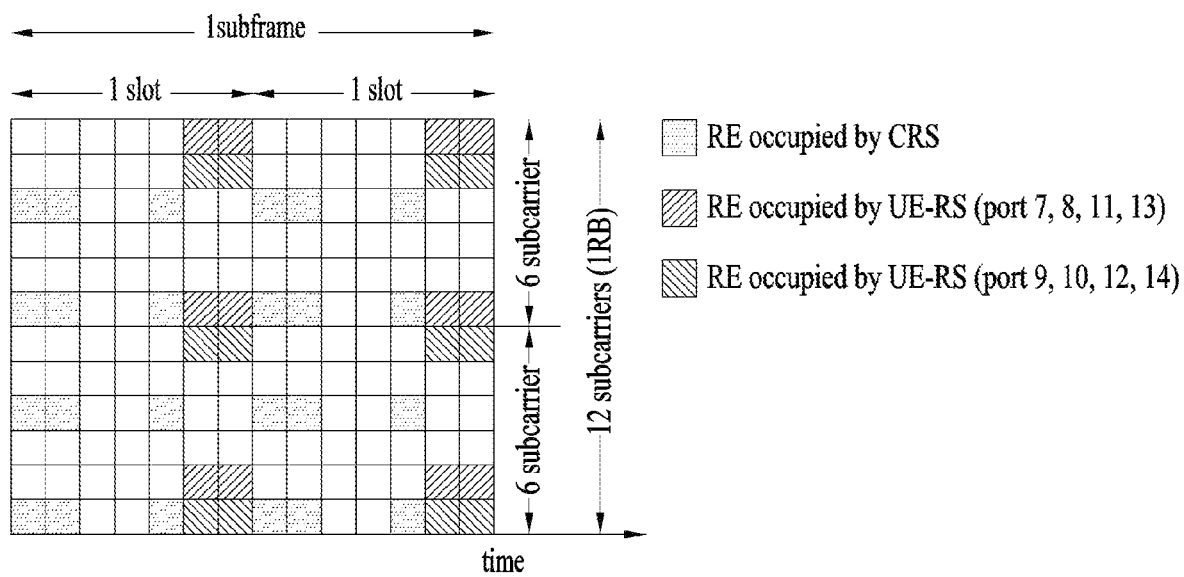
FIG. 9 illustrates an example of a subframe to which UE-specific Reference Signals (UE-RSs) are allocated.

FIG. 9 illustrates an example of a subframe to which UE-RSs are allocated, which may be used in embodiments of the present disclosure.

Referring to FIG. 9, the subframe illustrates REs occupied by UE-RSs among REs in one RB of a normal DL subframe having a normal CP.

UE-RSs are transmitted on antenna port(s) p=5, p=7, p=8 or p=7, 8, . . . , υ+6 for PDSCH transmission, where υ is the number of layers used for the PDSCH transmission. UE-RSs are present and are a valid reference for PDSCH demodulation only if the PDSCH transmission is associated with the corresponding antenna port. UE-RSs are transmitted only on RBs to which the corresponding PDSCH is mapped.

The UE-RSs are configured to be transmitted only on RB(s) to which a PDSCH is mapped in a subframe in which the PDSCH is scheduled unlike CRSs configured to be transmitted in every subframe irrespective of whether the PDSCH is present. Accordingly, overhead of the RS may decrease relative to overhead of the CRS.

In the 3GPP LTE-A system, the UE-RSs are defined in a PRB pair. Referring to FIG. 9, in a PRB having frequency-domain index nPRB assigned for PDSCH transmission with respect to p=7, p=8, or p=7, 8, . . . , υ+6, a part of UE-RS sequence r(m) is mapped to complex-valued modulation symbols $a_{k,l}^{(p)}$ in a subframe according to the following equation 10.

UE-RSs are transmitted through antenna port(s) corresponding respectively to layer(s) of a PDSCH. That is, the number of UE-RS ports is proportional to a transmission rank of the PDSCH. Meanwhile, if the number of layers is 1 or 2, 12 REs per RB pair are used for UE-RS transmission and, if the number of layers is greater than 2, 24 REs per RB pair are used for UE-RS transmission. In addition, locations of REs occupied by UE-RSs (i.e. locations of UE-RS REs) in a RB pair are the same with respect to a UE-RS port regardless of a UE or a cell.

As a result, the number of DMRS REs in an RB to which a PDSCH for a specific UE in a specific subframe is mapped is the same. Notably, in RBs to which the PDSCH for different UEs in the same subframe is allocated, the number of DMRS REs included in the RBs may differ according to the number of transmitted layers.

2. PQI and QCL Used in New Carrier Type 2. 1 New Carrier Type (NCT)

In LTE release 8/9/10/11 systems which are legacy systems, reference signals and control channels, such as a cell specific reference signal (CRS), a primary synchronization signal (PSS), a secondary synchronization signal (SSS), a PDCCH and a PBCH, are transmitted through a downlink component carrier.

However, in a next wireless access system, a downlink component carrier through which some or all of the CRS, the PSS, the SSS, the PDCCH and the PBCH are not transmitted due to a solution of an interference problem among a plurality of cells and improvement of carrier extendibility may be introduced. In the embodiments of the present invention, such a carrier will be defined as an extension carrier or a new carrier type (NCT).

The NCT described in the present invention may be one of Scells in case that a base station supports CA, and in case that the base station supports CoMP, the NCT may be a carrier or serving cell provided for data cooperative transmission from a neighboring base station. Also, the NCT is a small cell, and may be a cell synchronized with a reference cell (for example, P cell).

2. 2 UE Specific RS in NCT

One type of transmission diversity is a Space frequency block coding (SFBC) that uses two subcarriers of one OFDM symbol. Another type of transmission diversity is a space time block coding (STBC) that uses two OFDM symbols. In the NCT, these two kinds of transmission diversity schemes may be used. In the legacy LTE/LTE-A system (Rel'8/9/10), PDSCH signals transmitted using transmission diversity are demodulated using the CRS. However, since PDSCH demodulation based on the CRS is not supported in the NCT, PDSCH signals may be demodulated using a UE-specific reference signal (URS).

Generally, it is assumed that the same precoding as that of the PDSCH is applied to the URS. Therefore, the URSs corresponding to the number of PDSCH layers are only to be transmitted, whereby gain is obtained in view of RS overhead. However, the PDSCH to which transmission diversity is applied should be demodulated using the URS transmitted as much as the number of URS antenna ports corresponding to the number of transmitting antennas. For example, for demodulation of the PDSCH transmitted using transmission diversity based on two antennas, the URS transmitted through two antenna ports the same as those used for PDSCH transmission should be used.

Therefore, for demodulation of the PDSCH transmitted using transmission diversity, it is preferable that information on the number of URS antenna ports is notified to the UE. Methods for notifying the UE of the information on the number of URS antenna ports are as follows.

(1) Method 1: A method for configuring the number of URS antenna ports equally to the number of CSI-RS antenna ports configured for the corresponding UE.

(2) Method 2: A method for notifying the UE of the number of URS antenna ports used for demodulation of the PDSCH transmitted by transmission diversity through RRC signaling or PDCCH signal.

2. 3 PRB Bundling

It is assumed that the same precoding as that of downlink (DL) data transmitted through the PDSCH is applied to the URS. Therefore, The UE determines whether to use a plurality of PRBs allocated thereto during channel estimation depending on whether the same precoding is applied to a physical resource block (PRB) allocated to the UE. This will be referred to as PRB bundling, and the PRB bundling may be used during channel estimation on the assumption that the same precoding is applied to the PRBs within a PRB bundling window.

However, the same precoding may not be applied to the PDSCH data and URS, to which transmission diversity is applied, or precoding may not be applied to the URS, whereby restriction based on PRB bundling is not required. That is, when PDSCH data transmitted using transmission diversity are demodulated using the URS, PRB bundling is not used. At this time, the UE may perform an operation such as channel estimation by using all the URSs within the PRB allocated thereto.

3. Method for Transmitting Data by Using Distributed Virtual Resource Block (DVRB)

In the embodiments of the present invention, a DVRB (Distributed Virtual Resource Block) resource allocation scheme may be used to increase frequency diversity. In case of DVRB resource allocation, one PRB pair is located in different frequency domains based on a slot of a subframe. Therefore, to demodulate a PDSCH scheduled by a resource of the DVRB into the URS, precoding applied to the URS may be varied based on the slot.

For example, in a system having two antennas, PDSCH data and URS of a first slot of a specific subframe may be transmitted using precoding of $$\begin{bmatrix} a1 \\ a2 \end{bmatrix},$$

and PDSCH data and URS of a second slot of the specific subframe may be transmitted using $$\begin{bmatrix} b1 \\ b2 \end{bmatrix}.$$

In this case, $$\begin{bmatrix} a1 \\ a2 \end{bmatrix} \neq \begin{bmatrix} b1 \\ b2 \end{bmatrix}.$$

Also, the base station may command the UE to demodulate the DVRB, to which downlink data are transmitted, into the URS through a higher layer signal (RRC or MAC signal).

That is, a precoding matrix applied to a DVRB pair transmitted at the same subframe may be varied per slot. At this time, a case where the UE does not assume the same precoding matrix at different slots means that channel estimation is not performed by simultaneously using RSs of two slots. That is, an independent precoding matrix is used per slot.

In another aspect of the present invention, to demodulate the PDSCH signal allocated to the DVRB into the URS, a pair of PRBs located in different frequency domains may be located in the same frequency domain based on the slot of the subframe. Such distributed allocation may be configured by a higher layer of the base station. At this time, it is preferable that a size of RBG that performs PRB bundling is set to 1. That is, it is assumed that different precoding matrixes are applied to all the RBs. In this case, the UE may perform channel estimation in a unit of RB.

Hereinafter, the aforementioned embodiment of the present invention will be described with reference to FIG. 10.

Figure 10:
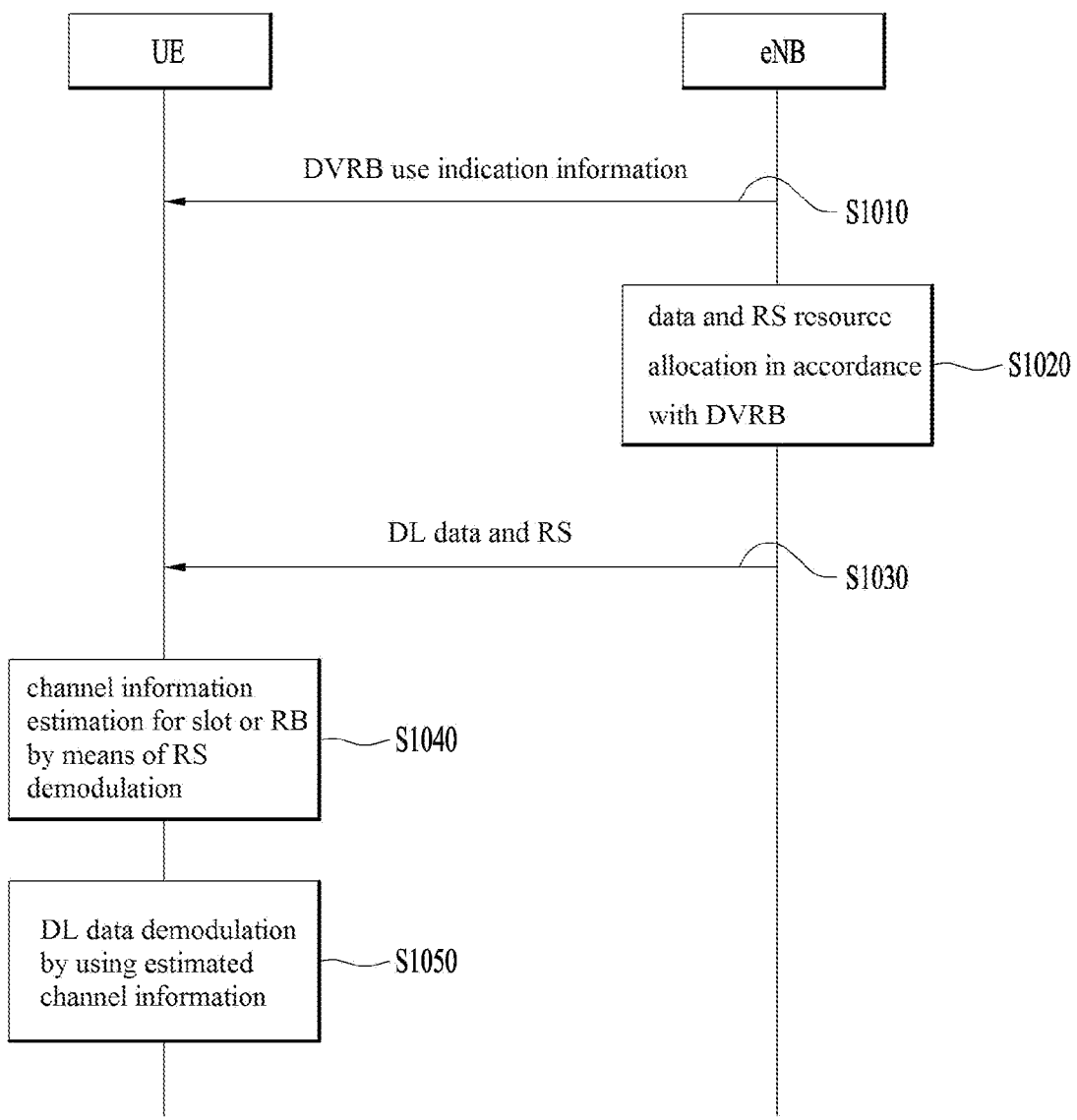
FIG. 10 illustrates one of methods for transmitting data by using a DVRB in an NCT.

FIG. 10 illustrates one of methods for transmitting data by using a DVRB in an NCT.

In FIG. 10, it is assumed that the UE and the base station are operated in the NCT. Description of the NCT will be understood with reference to the description of 2. 1. In FIG. 10, since the base station is operated in the NCT, the CRS cannot be used during downlink data transmission.

The base station (eNB) transmits a higher layer signal or PDCCH signal, which includes indication information indicating demodulation of the DVRB to the URS, to the UE (S1010).

The base station allocates data and URS to each slot or each RB of the subframe in accordance with the DVRB. At this time, a DM-RS may be used as one of the URSs. (S1020).

Afterwards, the base station transmits downlink data precoded by using different precoding matrixes per slot or RB and the DM-RS to the UE (S1030).

In step S1030, the downlink data may be an E-PDCCH (Enhanced PDCCH) signal. The E-PDCCH signal is control information transmitted through a data region.

If the indication information is received in the step S1010, the UE may recognize that DL data transmitted from the base station are transmitted in accordance with a DVRB scheme that includes a DM-RS. At this time, the UE may demodulate the DM-RS and data even without information on a precoding matrix applied to the DM-RS. This is because that the DM-RS is precoded by the same precoding matrix as that of the DL data. Information on the precoding matrix of the DL data may be a predetermined value on the system, or may be transmitted to the UE through a PDCCH signal.

Therefore, the UE estimates channel information per slot or RB by demodulating the DM-RS. Also, the UE may demodulate DL data by using the estimated channel information (S1040, S1050).

The base station may improve robustness during DL data transmission by applying DVRB based transmission diversity based on the DM-RS during DL data transmission. Also, a DVRB scheme that uses different precoding matrixes per slot is suitable for a UE of a high speed moving environment. Also, in case of a DVRB scheme that uses different precoding matrixes per RB, high gain may be obtained in an environment where many obstacles exist, that is, an environment where many path losses are generated.

In another embodiment of the present invention, the base station may explicitly notify the UE of a type of a precoding matrix used in the DVRB and/or information on antenna ports transmitted in accordance with the DVRB scheme in step S1010.

4. Transmission Mode

Next, transmission modes for supporting transmission diversity used in the NCT will be described.

4. 1 Transmission Mode t1

In the transmission mode t1, the base station transmits the PDSCH to eight layers by using antenna ports 7 to 14, and transmits control information by using a DCI format 2C.

If the number of URS antenna ports used for demodulation of the PDSCH transmitted using transmission diversity is 1, the base station transmits the PDSCH through a single antenna port or antenna port 7 without using transmission diversity, and transmits control information by using a DCI format 1A. If the number of URS antenna ports used for demodulation of the PDSCH transmitted using transmission diversity is greater than 1, the base station transmits the PDSCH (ports 7 and 8 in case of 2 URS antenna ports, and ports 7, 8, 9 and 10 in case of 4 URS antenna ports) by using transmission diversity, and transmits control information by using a DCI format 1A.

4. 2 Transmission Mode t2

In the transmission mode t2, the base station transmits the PDSCH to two layers by using antenna ports 7 and 8, and transmits control information by using a DCI format 2B.

If the number of URS antenna ports used for demodulation of the PDSCH transmitted using transmission diversity is 1, the base station transmits the PDSCH signal through a single antenna port or antenna port 7 without using transmission diversity, and transmits control information by using a DCI format 1A. If the number of URS antenna ports used for demodulation of the PDSCH transmitted using transmission diversity is greater than 1, the base station transmits the PDSCH (ports 7 and 8 in case of 2 URS antenna ports, and ports 7, 8, 9 and 10 in case of 4 URS antenna ports) by using transmission diversity, and transmits control information by using a DCI format 1A.

4. 3 Transmission Mode t3

In the transmission mode t3, the base station transmits the PDSCH by using transmission diversity, and transmits control information by using a DCI format 1. At this time, the base station transmits the PDSCH to a single antenna port or antenna port 7 with respect to all subframe types, and transmits control information by using a DCI format 1A.

5. Method for Transmitting CSI-RS Based PDSCH

When the UE estimates CQI in an NCT environment, a PDSCH transmission scheme that assumes a CSI reference resource assumes a transmission scheme that performs demodulation by using a UE specific RS in case of the NCT, and performs CQI estimation by using the CSI-RS. However, since a downlink and an uplink use the same frequency as each other in case of TDD, the amount of CSI feedback may be reduced using channel reciprocity. In order to support a method of CSI feedback that may use channel reciprocity, whether to perform feedback of PMI/RI may be configured by a higher layer of the base station.

In case of the transmission modes t1 and t2 in section 4, CSI is reported using a CSI-RS antenna port to enable multi-layer transmission. A CSI report for transmission diversity is inserted in the middle of CSI report for multi-layer transmission. Although the CSI report for multi-layer transmission accompanies RI/PMI transmission, the CSI report for transmission diversity may report CQI only. In case of the transmission mode t3 in section 4, the CSI report for a single antenna port may be inserted in the middle of the CSI report for transmission diversity. Although the CSI report for transmission diversity may report CQI only, the CSI report for a single antenna port may accompany PMI transmission.

The CSI report for transmission diversity is performed using the CSI-RS. At this time, in case of 2-antenna transmission diversity, 2 CSI RS ports (e.g., CSI RS ports 15 and 16) may be used, and in case of 4-antenna transmission diversity, 4 CSI RS ports (e.g., CSI RS ports 15, 16, 17 and 18) may be used.

6. Apparatus

Figure 11:
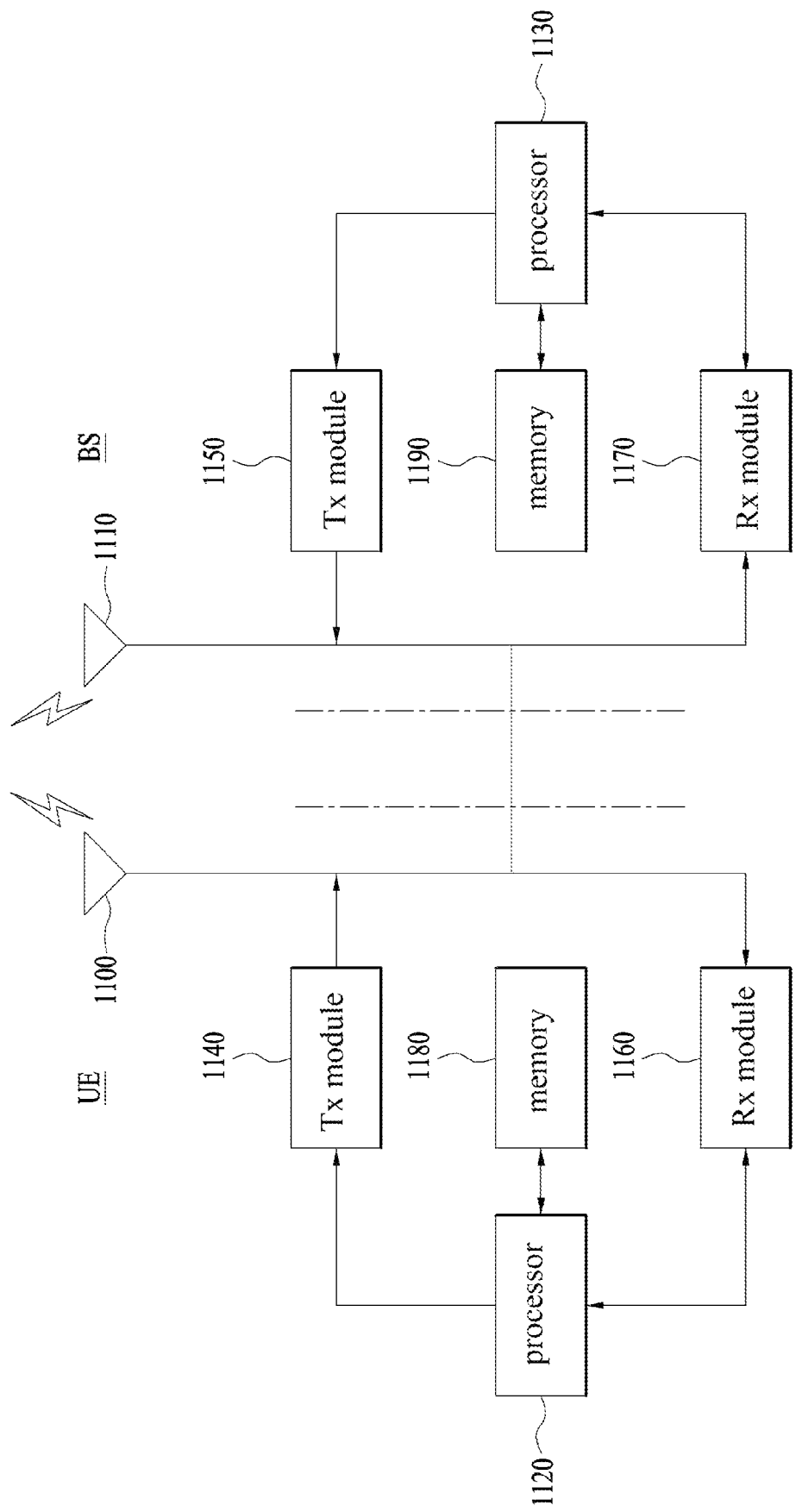
FIG. 11 illustrates a means through which methods described in FIGS. 1 to 10 may be implemented.

Apparatuses illustrated in FIG. 11 are means that can implement the methods described before with reference to FIGS. 1 to 10.

A UE may act as a transmitter on a UL and as a receiver on a DL. An eNB may act as a receiver on a UL and as a transmitter on a DL.

That is, each of the UE and the eNB may include a Transmission (Tx) module 1140 or 1150 and a Reception (Rx) module 1160 or 1170, for controlling transmission and reception of information, data, and/or messages, and an antenna 1000 or 1010 for transmitting and receiving information, data, and/or messages.

Each of the UE and the eNB may further include a processor 1120 or 1130 for implementing the afore-described embodiments of the present disclosure and a memory 1180 or 1190 for temporarily or permanently storing operations of the processor 1120 or 1130.

The embodiments of the present invention may be performed using the aforementioned elements and functions of the UE and the base station. For example, the base station may transmit downlink data and DM-RS in accordance with the DVRB scheme by applying different precoding matrixes to each slot or RB of the subframe. If indication information indicating transmission of the downlink data and DM-RS in accordance with the DVRB scheme is received from the base station, the UE may receive and demodulate data by using different precoding matrixes for each slot at the subframe at which the downlink data are transmitted.

The Tx and Rx modules of the UE and the eNB may perform a packet modulation/demodulation function for data transmission, a high-speed packet channel coding function, OFDMA packet scheduling, TDD packet scheduling, and/or channelization. Each of the UE and the eNB of FIG. 11 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 1180 or 1190 and executed by the processor 1120 or 1130. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to various wireless access systems including a 3GPP system, a 3GPP2 system, and/or an IEEE 802.xx system. Besides these wireless access systems, the embodiments of the present disclosure are applicable to all technical fields in which the wireless access systems find their applications.

The invention claimed is:

1. A method for enabling a user equipment to receive downlink data in a wireless access system supporting a new carrier type (NCT), the method performed by a user equipment (UE) and comprising:
   receiving a higher layer signal which includes indication information indicating demodulation of the downlink data by a UE-specific reference signal (URS), wherein the downlink data is transmitted using a distributed virtual resource block (DVRB) scheme;
   receiving the downlink data and the URS transmitted using the DVRB scheme based on different precoding matrices being applied to a first slot and a second slot of a subframe and the same precoding matrix being applied to the downlink data and the URS on the same slot;
   estimating channel information on the first slot and the second slot by demodulating the URS; and
   demodulating the downlink data according to the channel information,
   wherein the downlink data is transmitted using transmission diversity through two or more antennas and the URS is transmitted through a number of antenna ports which equals the number of antennas used for the downlink data transmission, and
   wherein information on the number of antenna ports used for the URS transmission is received through the higher layer signal.

2. The method according to claim 1, wherein the downlink data includes an enhanced physical downlink channel (E-PDCCH) signal.

3. The method according to claim 1, wherein the UE is operated in a new carrier type (NCT) to which a cell specific reference signal (CRS) is not allocated.

4. The method according to claim 1, wherein the number of antenna ports used for the URS transmission is configured to be equal to the number of CSI-RS antenna ports for the UE.

5. A method for transmitting downlink data at a base station (BS) in a wireless access system supporting a new carrier type (NCT), the method performed by the BS and comprising:
   transmitting a higher layer signal which includes indication information indicating demodulation of the downlink data by a user equipment-specific reference signal (URS), wherein the downlink data is transmitted using a distributed virtual resource block (DVRB) scheme; and transmitting the downlink data and the URS using the DVRB scheme by applying different precoding matrices to a first slot and a second slot of a subframe and applying the same precoding matrix to the downlink data and the URS on the same slot, wherein the downlink data is transmitted using transmission diversity through two or more antennas and the URS is transmitted through a number of antenna ports which equals the number of antennas used for the downlink data transmission, and wherein information on the number of antenna ports used for the URS transmission is transmitted through the higher layer signal.

6. The method according to claim 5, wherein the downlink data includes an enhanced physical downlink channel (E-PDCCH) signal.

7. The method according to claim 5, wherein the BS is operated in a new carrier type (NCT) to which a cell specific reference signal (CRS) is not allocated.

8. The method according to claim 5, wherein the number of antenna ports used for the URS transmission is configured to be equal to the number of CSI-RS antenna ports for the UE.

9. A user equipment (UE) for receiving downlink data in a wireless access system supporting a new carrier type (NCT), the UE comprising:

a receiver; and a processor that:

controls the receiver to receive a higher layer signal which includes indication information indicating demodulation of the downlink data by a UE-specific reference signal (URS), wherein the downlink data is transmitted by means of a distributed virtual resource block (DVRB) scheme, controls the receiver to receive the downlink data and the URS transmitted using the DVRB scheme based on different precoding matrices being applied to a first slot and a second slot of a subframe and the same precoding matrix being applied to the downlink data and the URS on the same slot, estimates channel information on the first slot and the second slot by demodulating the URS, and demodulates the downlink data according to the channel information, wherein the downlink data is transmitted using transmission diversity through two or more antennas and the URS is transmitted through a number of antenna ports which equals the number of antennas used for the downlink data transmission, and wherein information on the number of antenna ports used for the URS transmission is received through the higher layer signal.

10. The user equipment according to claim 9, wherein the downlink data includes an enhanced physical downlink channel (E-PDCCH) signal.

11. The UE according to claim 9, wherein the UE is operated in a new carrier type (NCT) to which a cell specific reference signal (CRS) is not allocated.

12. The UE according to claim 9, wherein the number of antenna ports used for the URS transmission is configured to be equal to the number of CSI-RS antenna ports for the UE.

13. A base station (BS) for transmitting downlink data in a wireless access system supporting a new carrier type (NCT), the BS comprising:

a transmitter; and a processor that:

controls the transmitter to transmit a higher layer signal which includes indication information indicating demodulation of the downlink data by a user equipment-specific reference signal (URS), wherein the downlink data is transmitted using a distributed virtual resource block (DVRB) scheme, configures the downlink data and the URS in accordance with the DVRB scheme by applying different precoding matrices to a first slot and a second slot of a subframe and applying the same precoding matrix to the downlink data and the URS on the same slot, and controls the transmitter to transmit the downlink data and the URS, wherein the downlink data is transmitted using transmission diversity through two or more antennas and the URS is transmitted through a number of antenna ports which equals the number of antennas used for the downlink data transmission, and wherein information on the number of antenna ports used for the URS transmission is transmitted through the higher layer signal.

14. The base station according to claim 13, wherein the downlink data includes an enhanced physical downlink channel (E-PDCCH) signal.

15. The BS according to claim 13, wherein the BS is operated in a new carrier type (NCT) to which a cell specific reference signal (CRS) is not allocated.

16. The BS according to claim 13, wherein the number of antenna ports used for the URS transmission is configured to be equal to the number of CSI-RS antenna ports for the UE.

* * * * *